3,595,863
TETRAHYDROQUINOLINE COMPOUNDS CONTAINING CYANOMETHYLIDINE AND BENZOICSULFIMIDO GROUPS
Clarence A. Coates, Jr., and Max A. Weaver, Kingsport, Tenn., assignors to Eastman Kodak Company, Rochester, N.Y.
No Drawing. Filed Dec. 2, 1968, Ser. No. 780,577
Int. Cl. C07d 33/10
U.S. Cl. 260—283CN                    7 Claims

ABSTRACT OF THE DISCLOSURE

Compounds having a 1,2,3,4-tetrahydroquinoline nucleus to which is attached a cyanovinylene group at the 6-position and a 1,2-benzisothiazolin-3-one-1,1-dioxide-alkyl group at the 1-position are useful as dyes for polyester textile materials.

This invention relates to certain novel methine compounds and, more particularly, to water-insoluble methine compounds containing an O-benzoicsulfimido group.

The novel methine compounds of the invention have the formula (I)

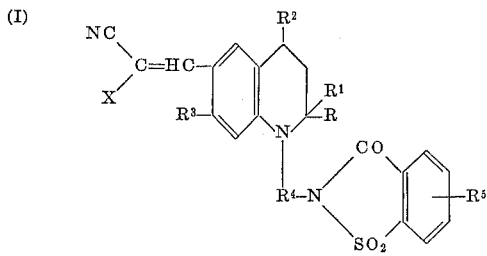

wherein

X is cyano, carbamoyl, lower alkylcarbamoyl, lower alkoxycarbonyl, lower alkylsulfonyl or arylsulfonyl;

R, $R^1$ and $R^2$ are the same or different and each is hydrogen or lower alkyl;

$R^3$ is hydrogen, lower alkyl, lower alkoxy, or halogen;

$R^4$ is lower alkylene; and $R^5$ is hydrogen, lower alkyl, lower alkoxy, halogen, or nitro.

The compounds of the invention give bright yellow dyeings when applied according to conventional dyeing procedures to polyester textile materials such as fibers, yarns, and fabrics. The novel methine compounds exhibit improved build-up and fastness properties such as fastness to light and resistance to sublimation on polyesters. The superior sublimation fastness possessed by the compounds of the invention renders them particularly useful in the thermal fixation technique of dyeing polyester materials. The description of the novel compounds as "water-insoluble" means that the compounds are not readily soluble, i.e. substantially insoluble, because of the absence of water-solubilizing groups such as sulfo groups and salts thereof.

Typical lower alkoxycarbonyl groups represented by X and $R^5$ include methoxycarbonyl, ethoxycarbonyl, propoxycarbonyl, isopropoxycarbonyl, butoxycarbonyl, etc. As used herein to describe a substituent, the word "lower" refers to an alkyl moiety having up to about 4 carbon atoms. Examples of the lower alkylsulfonyl groups which X can represent are methylsulfonyl, ethylsulfonyl, propylsulfonyl, butylsulfonyl etc. The aryl group of the arylsulfonyl groups which X can represent preferably is monocyclic, carbocyclic aryl such as phenyl and phenyl substituted, for example, with lower alkyl, lower alkoxy, or halogen. Examples of the substituted phenylsulfonyl groups which X can be are p-tolylsulfonyl, p-anisylsulfonyl, p-chlorophenylsulfonyl, p-bromophenylsulfonyl, etc. Typical lower alkyl substituted carbamoyl groups are N-methylcarbamoyl, N-ethylcarbamoyl, N-propylcarbamoyl, N-butylcarbamoyl, N,N-dimethylcarbamoyl, N,N-diethylcarbamoyl, N,N-dipropylcarbamoyl, etc.

Methyl, ethyl, propyl, isopropyl and butyl are examples of the alkyl groups which R, $R^1$, $R^2$, $R^3$ and $R^5$ can represent. Preferably, R, $R^1$ and $R^2$ are hydrogen or methyl or R is lower alkyl when $R^1$ and $R^2$ are hydrogen. Methoxy, ethoxy, propoxy, and isobutoxy are typical alkoxy groups which $R^3$ and $R^5$ can represent. Chlorine and bromine are representative halogen atoms represented by $R^3$ and $R^5$.

The alkylene groups represented by $R^4$ can be unsubstituted or substituted, straight- or branch-chain lower alkyl. Halogen, hydroxy, lower alkoxy and lower alkanoyloxy are examples of the substituents which can be present on the alkylene groups represented by $R^4$. Examples of such alkylene groups include ethylene, propylene, 1,2-propylene, butylene, 1,3-butylene, 2-hydroxypropylene, 2-ethoxypropylene, 2-chloropropylene, 2-acetoxypropylene, etc.

Particularly fast dyeings on polyester fibers are obtained from the compounds having the formula

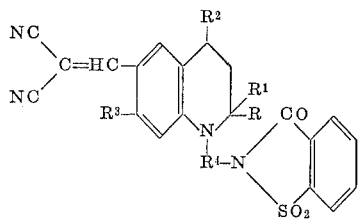

wherein R, $R^1$, $R^2$ and $R^3$ are the same or different and each is hydrogen or methyl, and $R^4$ is ethylene or propylene.

The novel methine compounds are prepared by condensing a 6-formyl-1,2,3,4-tetrahydroquinoline having the formula (II)

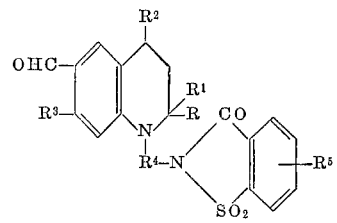

with an active methylene compound having the formula X—$CH_2$—CN in the presence of a basic catalyst such as piperidine. The compounds of Formula II are prepared by formylating the corresponding 6-unsubstituted compound by the Vilsmeier reaction, using $POCl_3$ and dimethylformamide. The 6-unsubstituted compounds are obtained by the reaction of a N-haloalkyl-1,2,3,4-tetrahydroquinoline with an o-benzoicsulfimide.

Examples of the N-halotetrahydroquinolines that can be used in preparing the novel methine compounds of the invention are N-2-chloroethyl-1,2,3,4-tetrahydroquinoline, N,2-chloroethyl-1,2,3,4-tetrahydro-2,7-dimethylquinoline, N-3-chloropropyl-1,2,3,4-tetrahydro-2,2,4-trimethylquinoline, N-(3-chloro-2-hydroxypropyl)-1,2,3,4-tetrahydro-2,2,4-trimethyl-7-bromoquinoline, N-2-chloroethyl-1,2,3,4-tetrahydro-2,2,4,7-tetramethylquinoline, N-(2-acetoxy-3-chloropropyl)-1,2,3,4-tetrahydro-2,2,4-trimethyl-3-chloroquinoline, etc.

The following active methylene compounds are illustrative of the compounds which can be used in the preparation of the methine compounds of this invention: malononitrile, methylcyanoacetate, ethylcyanoacetate, propylcyanoacetate, isopropylcyanoacetate, n-butylcyanoacetate, isobutylcyanoacetate, cyanoacetamide, methylsulfonacetonitrile, etc.

The following examples will further describe and illustrate the methods for preparing the intermediates and novel methine compounds.

EXAMPLE 1

25.2 g. 1 - (2-chloroethyl)-2,2,4,7-tetramethyl-1,2,3,4-tetrahydroquinoline, 18.3 g. o-benzoic sulfimide, 13.8 g. potassium carbonate, and 100 ml. dimethylformamide are refluxed together for 1 hour. The reaction was drowned into water. The product crystallizes and is collected by filtration and recrystallized from water and acetone to give pure product, melting at 141–143° C.

7.9 g. of the product obtained, 2-[2-(1,2,3,4-tetrahydro-2,2,4,7-tetramethyl - 1-quinilyl)ethyl]-1,2-benzisothiazoline-3-one-1,1-dioxide, is dissolved in 25 ml. of dimethylformamide. To this is added 2.4 ml. phosphorus oxychloride at 15–20° C. After heating for 1 hour at 95° C., the reaction mixture is drowned in an ice water mixture. This mixture is made basic with 50% NaOH and allowed to stand for a few hours until the product solidifies. The solid aldehyde is collected by filtration, washed with water, and air dried. After recrystallization from an ethanol and 2-methoxyethanol mixture the product, 2-[2-(6-formyl-1,2,3,4-tetrahydro - 2,2,4,7 - tetramethyl - 1 - quinolyl) ethyl] - 1,2 - benzisothiazoline-3-one-1,1-dioxide, melts at 177–178° C.

EXAMPLE 2

2.1 g. 2-[2-(6-formyl - 1,2,3,4 - tetrahydro-2,2,4,7-tetramethyl - 1 - quinolyl)ethyl] - 1,2-benzisothiazolin-3-one-1,1-dioxide, .33 g. malononitrile, 50 ml. alcohol, and 3 drops piperidine are refluxed together for 1 hour. The reaction mixture is allowed to cool and the product collected by filtration, washed with ethanol, and air dried. The product melts at 267–269° C. and has the structure:

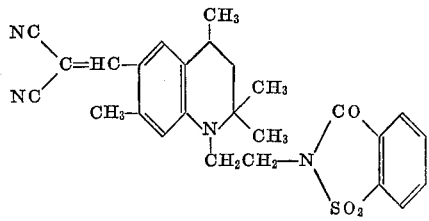

This compound colors polyester fibers bright shades of yellow having excellent light and sublimation fastness.

EXAMPLE 3

.43 g. 2 - [2 - (6 - formyl-1,2,3,4-tetrahydro-2,2,4,7-tetramethyl - 1 - quinolyl)ethyl] - 1,2-benzisothiazolin-3-one-1,1-dioxide, 0.1 g. methyl cyanoacetate, 25 ml. alcohol, and 1 drop piperidine are refluxed together for 1 hour. The reaction mixture is allowed to cool and the product collected by filtration, washed with ethanol, and air dried. The product, which melts at 198–200° C., dyes polyester fibers a deep shade of yellow and has the formula:

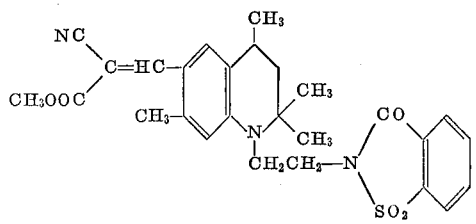

EXAMPLE 4

.43 g. aldehyde of Example 1, 0.18 g. phenylsulfonylacetonitrile, 1 drop piperidine, and 25 ml. alcohol are refluxed together for 1 hour. The reaction mixture is allowed to cool and the yellow product collected by filtration and air dried. The product melts at 289–290° C. and colors polyester fiber yellow. It has the formula:

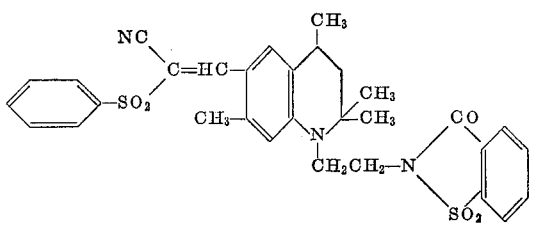

The compounds of the examples set forth in the table are prepared according to the procedures described in the preceding examples. The methine compounds of the table give yellow dyeings on polyester fibers and conform to Formula I.

TABLE

| Example No. | X | Substituents R, R¹, R², R³ | R⁴ | R⁵ |
|---|---|---|---|---|
| 5 | —CN | 2,2,4,7-tetra-CH₃ | —CH₂CH₂— | 6-NO₂ |
| 6 | —CN | 2,7-di-CH₃ | —CH₂CH₂— | H |
| 7 | —CN | None | —CH₂CH₂— | H |
| 8 | —CN | 2,2,4-tri-CH₃ | —CH₂CH₂— | H |
| 9 | —COOCH₃ | 2,2,4-tri-CH₃ | —CH₂CH₂— | H |
| 10 | —COOCH₃ | 2,2,4-tri-CH₃ | —CH₂CH(OH)CH₂— | H |
| 11 | —CN | 2,2,4,7-tri-CH₃ | —CH₂CHCH— (OOCCH₃) | H |
| 12 | —CN | 2,2,4-tri-CH₃ | —CH₂CHCH₂— (OOCCH₃) | H |
| 13 | —CN | 2,2,4-tri-CH₃—7—OCH₃ | —CH₂CH₂— | H |
| 14 | —CN | None | —CH₂CH₂CH₂— | 4-CH₃ |
| 15 | —CN | 7-Cl-2-CH₃ | —CH₂CH₂— | 5-Cl |
| 16 | —CN | 2,2,4,7-tetra-CH₃ | —CH₂CH(Cl)CH₂— | H |
| 17 | —SO₂C₆H₅ | 2,2,4,7-tetra-CH₃ | —CH₂CH₂CH₂— | H |
| 18 | —SO₂C₆H₅ | 2,2,4,7-tetra-CH₃ | —CH₂CH(CH₃)CH₂— | H |
| 19 | —COOC₂H₅ | 2,2,4,7-tetra-CH₃ | —CH₂CH(CH₃)CH₂— | H |
| 20 | —COOC₂H₅ | 2,2,4-tri-CH₃ | —CH₂CH₂— | H |
| 21 | —SO₂C₆H₄-p-CH₃ | 2,2,4-tri-CH₃ | —CH₂CH₂— | H |
| 22 | —CN | 2,2,4-tri-CH₃ | —CH₂CH₂— | 6-NHCOCH₃ |
| 23 | —CN | 7-Br-2,2,4-tri-CH₃ | —CH₂CH₂— | H |
| 24 | —COOCH₃ | 2,2,4-tri-CH₃ | —CH₂CH(OH)CH₂— | H |
| 25 | —CN | 7-CH₃-2-CH(CH₃)₂ | —CH₂CH₂CH₂— | H |
| 26 | —CN | 2,7-di-CH₃ | —CH₂CH₂CH₂— | 4-CH₃ |
| 27 | —CN | 2-CH₃-7-OCH₃ | —CH₂CH₂— | H |
| 28 | —SO₂C₆H₄-p-Cl | 2-CH₃-7-OCH₃ | —CH₂CH₂— | H |
| 29 | —CN | 2,7-di-CH₃ | —CH₂CH₂— | 5-COOC₂H₅ |
| 30 | —CN | 7-CH₃ | —CH₂CH₂— | H |

The compounds of the invention can be used for dyeing linear polyester textile materials according to known disperse dyeing procedures. Dyeing can be carried out at atmospheric or increased pressure using dispersing agents, carriers, etc. The following example illustrates a carrier dyeing procedure for applying the methine compounds of the invention to dye polyester textile materials.

EXAMPLE 161

0.1 g. of the compound of Example 2 is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for the removal of residual carrier) for 5 minutes at 350° C.

The compounds of the invention can also be applied to polyester textile materials by the heat fixation technique described in U.S. Pat. No. 2,663,612 and in the American Dyestuff Reporter, 42, 1 (1953). The following procedure describes how the methine compounds of the invention can be applied to polyester materials by the heat fixation technique.

EXAMPLE 162

A mixture of: 500 mg. of the compound of Example 6, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing 1 ml. of a complex diaryl sulfonate surfactant (compound 8-S), 3 ml. of a 3% solution of a sodium N-methyl-N-oleoyltaurate (Igepon T–S1), 8 ml. of a 25% solution of natural gums (Superclear 80 N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

10 g. of a fabric of poly(ethylene terephthalate) fibers and 10 g. of a fabric of 65/35 spun poly(ethylene terephalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The dyeing procedures described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,745, and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel methine compounds can also contain minor amounts of other additives such as brighteners, pigments, delusterants, inhibitors, stabilizers, etc. Although the compounds are particularly useful for dyeing polyester materials, they can also be used to dye other hydrophobic textile materials such as cellulose acetate and polyamide fibers.

The invention has been described in detail with particular reference to preferred embodiments thereof, but it will be understood that variations and modifications can be effected within the spirit and scope of the invention.

We claim:

1. A methine compound having the formula

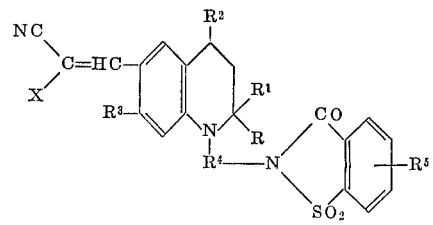

wherein

X is cyano, carbamoyl, lower alkylcarbamoyl, lower alkoxycarbonyl, lower alkylsulfonyl, phenylsulfonyl, lower alkylphenylsulfonyl, or halophenylsulfonyl;

R, $R^1$ and $R^2$ are the same or different and each is hydrogen or methyl or when $R^1$ and $R^2$ each is hydrogen R can be lower alkyl;

$R^3$ is hydrogen, lower alkyl, lower alkoxy, or halogen;

$R^4$ is lower alkylene, lower alkoxy-lower-alkylene, lower hydroxyalkylene, lower haloalkylene, or lower alkanoyloxy-lower-alkylene; and $R^5$ is hydrogen, lower alkyl, lower alkoxy, halogen, nitro, or lower alkoxycarbonyl.

2. A compound according to claim 1 having the formula

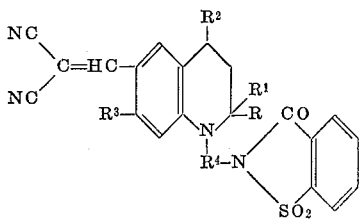

wherein R, $R^1$, $R^2$ and $R^3$ are the same or different and each is hydrogen or methyl.

3. A compound according to claim 2 wherein R, $R^1$, $R^2$, and $R^3$ each is methyl.

4. A compound according to claim 2 wherein R and $R^3$ each is methyl; $R^1$ and $R^2$ each is hydrogen.

5. A compound according to claim 2 where R, $R^1$ and $R^2$ each is methyl; $R^3$ is hydrogen.

6. A compound according to claim 2 wherein R, $R^1$, $R^2$ and $R^3$ each is hydrogen.

7. A compound according to claim 2 wherein R, $R^1$, and $R^2$ each is hydrogen; $R^3$ is methyl.

References Cited

UNITED STATES PATENTS

| | | | |
|---|---|---|---|
| 3,240,783 | 3/1966 | Straley et al. | 260—287X |
| 3,394,130 | 7/1968 | Straley et al. | 260—240.9 |
| 3,453,280 | 7/1969 | Weaver et al. | 260—287 |

DONALD G. DAUS, Primary Examiner

U.S. Cl. X.R.

8—55; 260—283, 283S, 287R, 289R, 302F, 465